Patented Oct. 5, 1937

2,094,595

UNITED STATES PATENT OFFICE 2,094,595

CHEMICAL COMPOUNDS

Emeric Havas, Pitman, N. J., assignor to E. I. du Pont de Nemours & Company, Wilmington, Del., a corporation of Delaware No Drawing. Application November 14, 1935, Serial No. 49,843

6 Claims. (Cl. 260—53)

This invention relates to new and useful chemical compounds, more particularly compounds which are useful as intermediates for the preparation of indigoid dyes, and processes for the preparation thereof.

It is an object of the invention to provide new and improved chemical compounds which are especially useful in the preparation of indigoid dyes. A further object is the provision of processes for the production of said compounds. Other objects will appear hereinafter.

These objects are accomplished in accordance with this invention by the preparation of compounds having the formula:

(1) 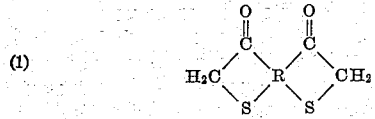

wherein R represents an aromatic nucleus in which both thiophene nuclei are condensed on the same benzene nucleus.

These new products may be produced by various procedures. In general, the process steps comprise (1) introducing two mercapto (—SH) groups into an aromatic nucleus, (2) converting these mercapto groups to thioglycollyl radicals by interaction of the alkali metal (e. g., sodium) salts of the mercaptans with a salt of chloracetic acid, (3) neutralizing, and (4) ring-closing the bis-thioglycollic acids.

Any of the following methods of introducing the mercapto radicals may be used:

(a) An arylamine is diazotized, then treated with sodium xanthate. The ester of xanthic acid thus obtained is hydrolyzed to the mercaptan. The reactions may be formulated as follows:

(2) 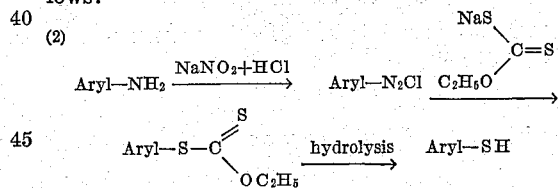

(b) An aryl-sulfonic acid is converted to the sulfonyl chloride, and the latter material reduced to the mercaptan, for example, by the action of zinc and an acid. This is formulated as follows:

(3) 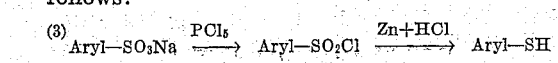

(c) An arylamine may be converted to the mercaptothiazole by the action of carbon bisulfide and sulfur. This product is hydrolyzed by strong alkali to the ortho-amino-mercaptan. These reactions may be formulated as follows:

(4) 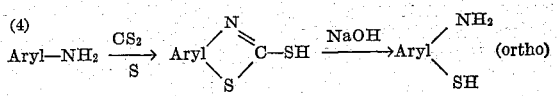

The reaction of the sodium salts of the mercaptans with a salt of chlor-acetic acid may be formulated as follows:

(5) 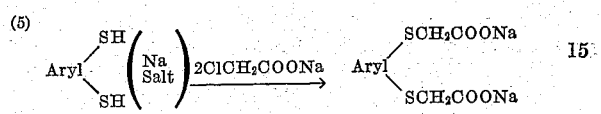

The neutralization of the alkali metal salts of the dithioglycollic acid may be effected in any suitable manner to form the free acid, e. g., with hydrochloric acid.

The ring-closure is preferably effected by treatment of the dithioglycollic acids with anhydrous aluminum chloride, as illustrated in the examples.

By a proper selection and order of the above reactions and other methods, two thioglycollyl groups may be introduced into the same benzene nucleus. Likewise, these thioglycollyl groups may be introduced ortho-, meta- or para- to each other. The orientation of the thiophene nuclei will depend, of course, on the relative positions of the thioglycollyl groups.

The invention will be further understood, particularly with regard to selection of the methods of reaction, proportions of materials, etc., by reference to the following examples, in which the quantities are stated in parts by weight.

EXAMPLE I

*Preparation of benzene-ortho-bis-thioindoxyl*

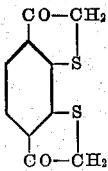

A mixture of 400 parts of 2-mercapto-benzothiazole, 700 parts of sodium hydroxide and 1000 parts of ortho-dichlorobenzene was heated for six hours at 180° C. After cooling, the solid mass was diluted with 2000 parts of water, the ortho-dichlorobenzene removed by steam distillation, and the still residue neutralized at the boil with about 1500 parts of hydrochloric acid of 30% strength. The mass then was cooled to 20° C. By this process the 2-mercapto-benzothiazole was converted to ortho-amino-thiophenol.

Four hundred (400) parts of chlor-acetic acid was neutralized with sodium hydroxide solution, about 550 parts of caustic of 30% strength being required. Ice was added as required to hold the temperature below 20° C. The ortho-amino-thiophenol, as described above, was then added. The reaction mass was heated slowly to 50° C., sodium hydroxide solution being added gradually to maintain alkalinity to phenol-phthalein papers. The mass was held at 50° C. until the mercaptan test with lead acetate papers was negative. By this procedure, ortho-amino-phenyl-thioglycollic acid (sodium salt) was produced.

The solution of ortho-amino-phenyl-thioglycollic acid (sodium salt) was filtered, acidified, and boiled for fifteen minutes to form the lactam. The mass was cooled to 60° C., made alkaline, and the insoluble lactam filtered off and washed with cold water.

The lactam was mixed with 430 parts of sodium hydroxide solution of 30% strength and 100 parts of water, and heated to 105°–107° C. for one and one-half hours. At the end of this time, complete solution was effected. The solution was diluted with 500 parts of water, cooled to room temperature, and neutralized to faint alkalinity with 230 parts of commercial hydrochloric acid. One hundred five (105) parts of sodium nitrite were added. The solution was stirred into a mixture of 480 parts of commercial hydrochloric acid, enough ice being added to hold the temperature at 0°–5° C.

When a clear diazo solution was obtained, it was added at 70° C. to a mixture of 1100 parts of water, 320 parts of soda ash, and the sodium xanthate solution obtained from 260 parts of 30% caustic soda, 187 parts of ethyl alcohol and 144 parts of carbon bisulfide. The reaction mass was stirred at 70° C. until tests for diazo were negative.

Xanthate obtained by the above procedure was added to 360 parts of 30% caustic soda, and the mass stirred at 95° C. for two hours to complete the hydrolysis. By this procedure, ortho-mercapto-phenyl-thioglycollic acid was obtained.

The reaction mass was cooled to 30° C., and 240 parts of chlor-acetic acid, previously neutralized with caustic soda, was added. The charge was heated slowly to 70° C. and stirred for one hour. At the end of this time, tests for mercaptan were negative. The solution was filtered and the filtrate added to 900 parts of commercial hydrochloric acid. Ortho-phenylene-bis-thioglycollic acid was precipitated. The product was filtered and washed. It may be purified by redissolving in dilute sodium carbonate solution, filtering and reprecipitating.

Ortho - phenylene - bis - thioglycollic acid, obtained by the above procedure, melted at 204° C. The pure product melts at 209° C.

Twenty-two (22) parts of ortho-phenylene-bis-thioglycollic acid, 26 parts of phosphorus trichloride and 300 parts of chlorobenzene were heated for one hour at 100° C. The mass was cooled to 20° C., and 26 parts of anhydrous aluminum chloride added. The charge was heated for one hour at 60° C. It then was run into a mixture of 400 parts of water, 130 parts of 30% caustic soda, and 13 parts of sodium carbonate. The chlorobenzene was removed by steam distillation. The suspension remaining in the still was diluted with water to 1000 parts, acidified at 60° C. with hydrochloric acid to a strong reaction on Congo red paper, and the insoluble benzene-ortho-bis-thioindoxyl was filtered off, washed with water, and dried. The new product thus obtained melted at 157° C.

EXAMPLE II

*Preparation of benzene-meta-bis-thioindoxyl*

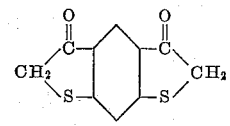

Six hundred (600) parts of zinc dust were stirred with 1000 parts of ethyl alcohol. Two hundred twenty-four (224) parts of benzene-meta-disulfochloride were added in small portions at 40° C. The mass was stirred for one-half hour, then 1800 parts of commercial hydrochloric acid were added in small portions, the temperature being held at approximately 30° C. When all the acid had been added, the mixture was heated to the boil, and an additional 450 parts of hydrochloric acid added; and the mass boiled under reflux for two hours. The reaction mass was then steam distilled until all of the dithio-resorcin had been accumulated in the distillate. Approximately 4000 parts of distillate were obtained.

The distillate, which contained the dithio-resorcin in aqueous alcoholic suspension was made alkaline to phenol-phthalein papers by the addition of sodium hydroxide. One hundred sixty (160) parts of chlor-acetic acid were neutralized with sodium hydroxide, and then added to the dithio-resorcin solution. The mass was heated to 60° C. and held at this temperature until a negative test for mercaptan was obtained with lead acetate papers. The alcohol was removed by distillation, and the remaining liquid filtered, cooled and acidified with hydrochloric acid. The precipitated meta-phenylene-bis-thioglycollic acid was filtered, washed and dried. The new product was obtained in colorless crystals, melting at 130°–131° C.

Six hundred (600) parts of chlorobenzene, 44 parts of meta-phenylene-bis-thioglycollic acid and 53 parts of phosphorus trichloride were heated for one hour at 85° C. The reaction mass was cooled to 20° C., 53 parts of anhydrous aluminum chloride added, and the charge heated to 60° C. for one hour to effect ring-closure. The mass was then added to 1000 parts of water, 250 parts of caustic soda of 30% strength and 25 parts of soda ash. The chlorobenzene was removed by steam distillation. The still residue was diluted to 2000 parts, and acidified with hydrochloric acid to precipitate the benzene-meta-bis-thioindoxyl. The product is obtained as light brown crystals, melting at 108° C.

EXAMPLE III

*Preparation of benzene-para-bis-thioindoxyl*

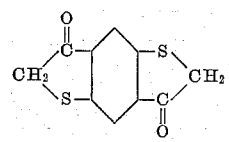

Forty-four parts of para-aminophenyl thioglycollic acid were stirred with 80 parts of commercial hydrochloric acid, and diazotized at 0°–5° C. by the addition of 15 parts of sodium nitrite. Ice was added as required and the stated temperature maintained. The finished diazo solution had a volume of about 400 parts. It was added at 70° C. to a mixture of 200 parts of water, 40 parts of soda ash, and the xanthate solution obtained from 43 parts of sodium hydroxide solution of 30% strength, 7 parts of water, 31 parts of alcohol and 24 parts of carbon bisulfide. The mass was stirred for one-half hour at 70° C., 60 parts of 30% caustic soda added, the charge heated for two hours at 100° C., then cooled to 30° C. Forty (40) parts of chlor-acetic acid, previously neutralized with caustic soda, were added to the above product. The charge was heated at 70° C. for two hours, at which point tests for mercaptan were negative. The sodium salt of para-phenylene-bis-thioglycollic acid thus produced was precipitated by the addition of 100 parts of sodium chloride and cooling of the salted solution. The precipitated sodium salt was separated by filtration, redissolved in 500 parts of water at 50° C., and the free acid precipitated by acidification. The new compound, para-phenylene-bis-thioglycollic acid was obtained as almost colorless crystals, melting at 212° C.

Twenty-two (22) parts of para-phenylene-bis-thioglycollic acid, 300 parts of chlorobenzene and 26 parts of phosphorus trichloride were heated for one hour to 100° C. The mass then was cooled to 20° C., 26 parts of anhydrous aluminum chloride added, the charge heated for one hour at 60° C. The condensation mass was added to a mixture of 400 parts of water, 130 parts of 30% caustic soda solution, 13 parts of soda ash. The chlorobenzene was removed by steam distillation. The still residue was diluted to 1000 parts, cooled to 60° C., and acidified with commercial hydrochloric acid. The precipitated benzene-para-bis-thioindoxyl was filtered off, washed and dried. It was obtained as light brown crystals, melting at 122°–125° C.

Obviously, the remaining positions in the parent benzene nucleus of the benzene-bis-thioindoxyls may be occupied by other substituents such as, for example, alkyl, alkoxy, halogen and, in general, non-reducible substituents which have an auxochromic effect when the thioindoxyls are converted to indigoid dyestuffs. In certain instances, it will be advantageous to have the substituents present in the bis-thioglycollic acids prior to ring-closure, as, for example, alkyl and alkoxy radicals such as methyl, ethyl, isopropyl, butyl, methoxy, ethoxy, butyloxy, and higher homologues. In other instances, the substituents may interfere with the ring-closure of the bis-thioglycollic acids and, hence, are preferably introduced subsequent to the ring-closure, as, for example, halogen atoms (e. g., chlorine and/or bromine). This introduction may be effected by halogenation, preferably in the presence of a halogen carrier. Likewise, R in general formula (1) may be a naphthalene, anthracene or other poly-nuclear radical in which the two thiophene nuclei are condensed on a single benzene nucleus of such poly-nuclear compounds.

Other methods of producing the aromatic mercaptans and thioglycollic acids may be followed in the preparation of the bis-thioglycollic acids for ring-closure to the bis-thioindoxyls. These products are valuable intermediates for the production of dyestuffs, as, for example, indigoid dyestuffs such as described in my co-pending application, U. S. Serial No. 49,844 filed of even date herewith.

As many apparently widely different embodiments of this invention may be made without departing from the spirit and scope thereof, it is to be understood that I do not limit myself to the specific embodiments thereof except as defined in the appended claims.

I claim:

1. Bis-thioindoxyls having the general formula:

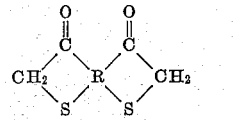

wherein both thiophene nuclei are condensed on the same benzene nucleus of an aromatic radical R.

2. The compound, benzene-ortho-bis-thioindoxyl, having the general formula:

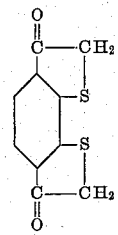

3. The compound, benzene-meta-bis-thioindoxyl, having the general formula:

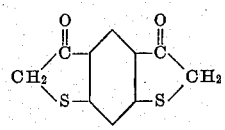

4. The compound, benzene-para-bis-thioindoxyl, having the general formula:

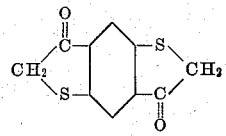

5. The process of preparing benzene-ortho-bis-thioindoxyl which comprises heating 2-mercapto-benzothiazole with sodium hydroxide in an organic solvent to convert the mercapto-benzothiazole to the sodium salt of ortho-amino-thiophenol, neutralizing, adding the resultant free ortho-amino-thiophenol to a solution of sodium chloro-acetate, heating to convert said ortho-amino-thiophenol to the ortho-amino-phenyl-thioglycollic acid sodium salt, converting said sodium salt to the lactam by acidification and heating, heating the lactam with caustic alkali solution until complete solution is effected, cooling, neutralizing the resulting solution to faint alkalinity with a mineral acid, diazotizing, reacting the diazo compound with sodium xanthate to form an ester of xanthic acid, hydrolyzing said ester to the ortho-mercapto-phenyl-thioglycollic acid, further reacting said ortho-mercapto compound with sodium chlor-acetate to produce ortho-phenylene-bis-thioglycollic acid, heating said ortho-phenylene-bis-thioglycollic acid with phosphorus trichloride in chloro-benzene, and ring-closing to the benzene-ortho-bis-thioindoxyl by treatment with aluminum chloride.

6. In a process of preparing benzene-para-bis-thioindoxyl, the steps which comprise diazotizing para-amino-phenyl thioglycollic acid, converting the diazo compound to an ester of xanthic acid by treatment with sodium xanthate, hydrolyzing the resultant ester to the mercaptan by heating with caustic alkali solution, reacting the resultant mercaptan with the sodium salt of chlor-acetic acid to form the sodium salt of para-phenylene-bis-thioglycollic acid, neutralizing to produce the free para-phenylene-bis-thioglycollic acid, and ring-closing said compound in the form of its dichloride with anhydrous aluminum chloride.

EMERIC HAVAS.